G. Hely,
Horse Power.
Nº 22,950.   Patented Feb. 15, 1859.
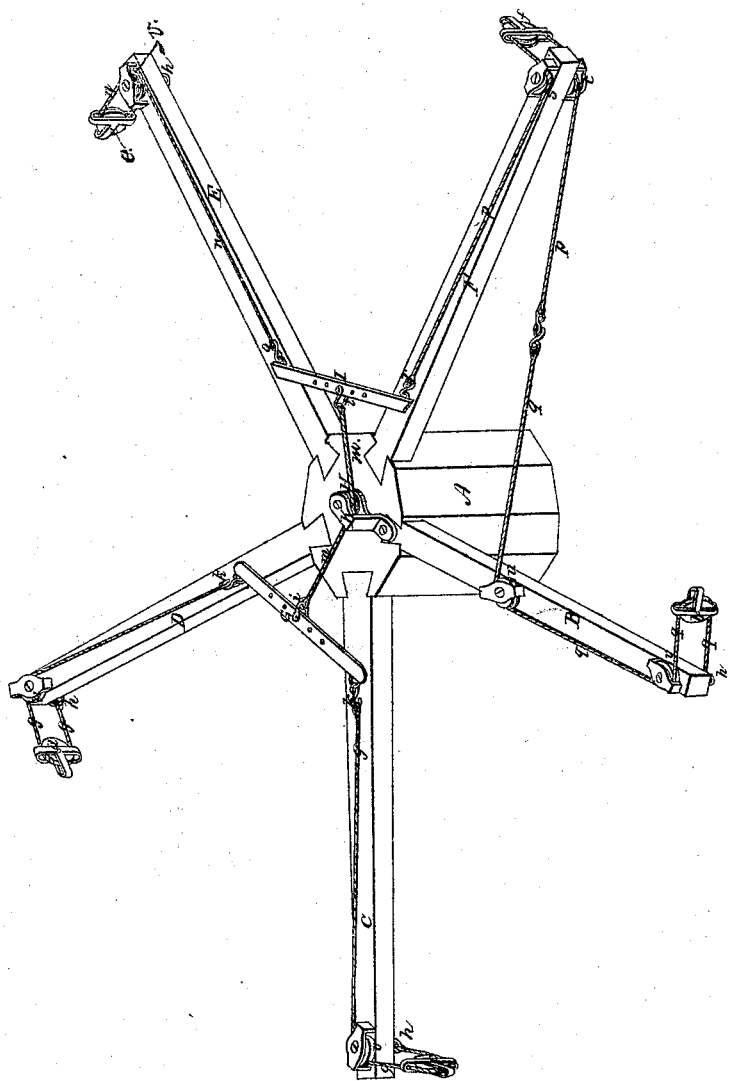
Witnesses.
J. N. Coston
Henry Hely
Inventor
George Hely

UNITED STATES PATENT OFFICE.

GORGES HELY, OF LAPORTE, INDIANA.

HORSE-POWER EQUALIZER.

Specification of Letters Patent No. 22,950, dated February 15, 1859.

*To all whom it may concern:*

Be it known that I, GORGES HELY, of Laporte, in the county of Laporte and State of Indiana, have invented certain new and useful Improvements in Horse-Power Equalizers; and I do hereby declare that the following is a full, clear, and exact description of the construction and operation of the same, reference being had to the accompanying drawings, which represent said horse-power equalizer is a perspective view.

The nature of my invention relates to the manner of connecting the draft chains or ropes of a horse power gearing with each other so that each horse or team may be compelled by the action of the other pulling horses to bear its due proportion of the draft, by which means the motion of the machine is not changed by the quick or slow motion of some of the horses. Where the horse power is arranged with four levers, the application of the contrivance is comparatively easy, but where five levers are used as is often the case, it becomes more difficult to use an equalizing arrangement, without making the machine too complicated.

To enable others skilled in the art to make and use my invention, I will proceed to describe its construction and operation.

A, represents the central shaft of the horse power to which five levers B, C, D, E, F, are secured in any well known manner; b, c, d, e, f, are tackle blocks through the horizontal loops of which the chains of the swingle trees pass. Each of the ropes or chains g, which pass around the pulleys of the blocks c, and d, is secured at one end to the lower side of its respective lever D, and C, as shown at h, while the other ends k, after passing around the pulleys are secured by means of hooks or otherwise to the ends of the bar G. The bar G, is secured to the rope or chain m, which passes around the pulley H, and to the other end of the rope or chain m, is secured the bar I, similar in shape to the bar G. The pulley H, has its bearings in the block K, which is permanently secured to the top of the shaft A. The two ends of the rope or chain n, which pass around the pulley of the block e, are respectively fastened at o, to the bar I, and at h, to the lever E. Now if this machine was constructed with four levers, the ropes or chains on the levers E and F, could be arranged in a similar manner as the ropes or chains of the levers C, D, but to use a fifth arm B, with a similar arrangment as the levers above described, and with similar effect on the fifth horse or team, the ropes or chains p and q, are arranged in the following manner. One end of the rope p, is secured at r, to the bar I; the rope or chain then passes over the pulley s, then over the pulley of the block f, then around the pulley t, on the lower side of the lever F, and is secured at its other end to the rope or chain q, which passes around a pulley u on arm B, then over the pulley v, then over the pulley of the block b, and the end of it is secured at h to the lever B.

In operating this horse power, it will be seen that if one team attached to either of the blocks b, c, d, e, f, should start and pull before the other teams did, it would by means of the arrangement of ropes or chains passing through said blocks, fetch the draft immediately against the team or teams that had not yet started so that they would have to bear their equal proportions of the labor in moving the machine and thereby preventing the slow team having any advantage over the more active one, by which means the motion of the machine is not changed by the quick or slow motions of some of the teams, and each does its due share of the work. If it be desirable to favor a weaker horse or team, and yet compel it to perform its due share of so reduced labor, the clevis i, on the bars G, I, may be shifted to any one of the series of adjusting holes therein, and give to the weaker horse or team, the longer end of the lever, and thus five or ten horses may be worked at pleasure. The rope or chain m, that connects the two eveners G, I passes around a pulley H, which is at the center of the shaft A, which keeps it in its proper position, while the eveners themselves may move from or toward the center of the shaft freely, or as the irregular workings of the horses or teams may allow.

Having thus fully described my invention what I claim therein as new is—

1. Connecting the eveners G, I, by a rope or chain that passes over a pulley at the center of the shaft A, substantially as described.

2. I also claim in combination with the eveners, the method of connecting the points or parts to which the horses are hitched, and by which they draw, by means of a system of ropes or chains, and pulleys connected with the draft bars, substantially as herein described.

GORGES HELY.

Witnesses:
J. N. COSTON,
HENRY HELY.